June 9, 1925.                                                                 1,541,037
W. P. FLEMING
DRIVE-A-WAY TOWING FIXTURE
Filed May 5, 1923

INVENTOR

By Walter P. Fleming
Myron J. Dikeman
ATTORNEY

Patented June 9, 1925.

1,541,037

UNITED STATES PATENT OFFICE.

WALTER P. FLEMING, OF HIGHLAND PARK, MICHIGAN.

DRIVE-AWAY TOWING FIXTURE.

Application filed May 5, 1923. Serial No. 636,912.

*To all whom it may concern:*

Be it known that I, WALTER P. FLEMING, a citizen of the United States of America, residing in the city of Highland Park, county of Wayne, State of Michigan, have invented certain new and useful Improvements in a Drive-Away Towing Fixture, and declare the following to be a full, clear, and exact description of the same, such as will enable others skilled in the art to which it pertains to make and use the same, reference being had to the accompanying drawings, which form a part of these specifications.

The object of my invention is to provide a drive-away towing fixture for attaching to the rear axle of an automobile, provided with means for connecting the steering bar of the towing device now in use for drawing away cars. At the present time a special towing device is in common use among the dealers and manufacturers of automobiles, for moving several automobiles at one time and with only one driver, by connecting several cars together in a line, each trailing auto being provided with a drive-a-way steering device attached to the automobile ahead, and by which the trailing car is drawn. My invention relates to the special fixture designed for attaching the steering bar to the rear axle of the car next ahead.

Another object of my invention is to provide a towing fixture that can be quickly and easily attached to the axle of the automobile by the use of a single bolt, in such a manner as to provide a rigid support for both the forward and backward movement of the car, and being supported by a three point suspension.

A further object is to provide a towing fixture that can be securely attached to the rear axle of the auto, by the use of a single clamping device around the gear bearing of the axle housing.

A still further object is to construct a towing fixture for automobiles that is simple in construction, easily and efficiently operated and can be manufactured at a low cost.

These several objects are secured in their preferred form by the construction and arrangement of parts more fully hereinafter set forth.

Similar parts on all drawings are marked by similar numerals.

Figure 1:
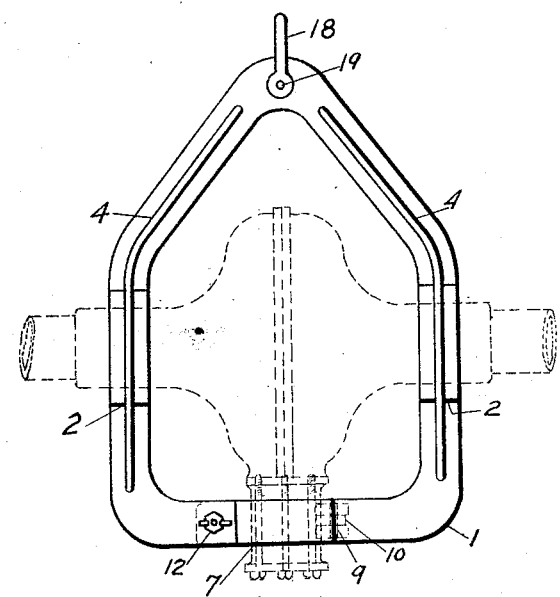
Fig. 1, is a plan view of the towing fixture showing it in position on the rear axle of an automobile.
Figure 2:
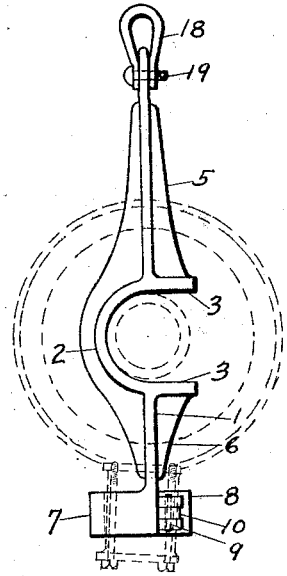
Fig. 2, is a side view of the fixture showing the means for attaching same to the bearing of the axle housing.
Figure 3:
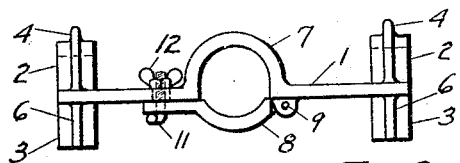
Fig. 3, is a view of the forward end of the fixture with the clamping device.

I will now describe more fully the detailed construction of my towing fixture, referring to the drawings and the marks thereon.

Figure 4:
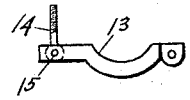
Figs. 4 and 6, are alternate forms of hinge clamps that may be used in connection with the towing fixture.
Figure 5:
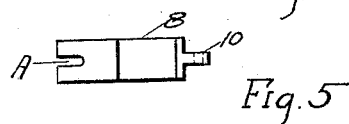
Fig. 5 is a plan view of the hinge clamp shown in Fig. 3.
Figure 6:
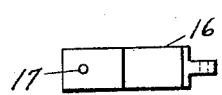

The fixture body —1— is made of a metal bar, of a shape and size to pass over the gear housing in the center of the rear axle of the automobile, resting on the axle stubs, and on the drive gear bearing attached to the front side of the main housing. At the points where the fixture frame rests on the axle stubs, U-shaped sockets —2— are provided, extending over the top of the axle stubs in such a manner as to allow the main frame —1— to rest at about the central portion of the axle shaft, and in a horizontal plane. The arms —3— of the U-sockets extend below the axle to give support and rigidity to the fixture while under the draft due to the load, or the shock from stopping the cars too quickly, thus preventing an undue strain on the pinion bearing in the axle housing. Along both of the horizontal arms of the main casting —1—, are the stiffening ribs —4—, for increasing the strength of the fixture without a material increase in weight. The arms —3— of the U-sockets are also provided with stiffening ribs 5 and —6— to prevent bending caused from undue strain or shock. At the forward end of the main casting —1—, and in the center thereof, is the U-bearing —7—, shaped and positioned to receive the drive pinion bearing housing mounted on the front side of the axle housing, and fitting snugly thereon. Directly beneath the U-bearing —7— and hinged to the main casting —1—, is the hinge clamp —8—, made of metal and of such size and shape as to firmly hold the U-bearing —7— in position on the gear bearing of the axle housing. The hinge —8— is attached to the casting by means of the pin —9— passing through the hinge joint —10—. The outer end of the hinge clamp —8— is provided with the slotted opening —A—, shown in Fig. 5, for receiving the hook bolt —11— as the clamp is put in place. The hook bolt —11— is formed of an L-shaped rod, one end being bent at right angle to the body of the bolt, and the other end being threaded to receive the thumb nut —12—. By loosening the nut —12— on the bolt —11—, the L-shaped end can be turned until parallel with the slotted opening —A— in the hinge clamp —8—, allowing the clamp to be opened without removing the bolt from the main casting. The fixture can then be removed from the auto axle by lifting the frame up until the U-socket bearings are clear from the axle shaft. Fig. 4, shows an alternate form of hinge clamp —13— that may be used, but having the attaching bolt —14— connected thereto by means of the pin —15—, and which enters the slotted hole in the main casting —1— in the same position as the hook bolt —11—. Fig. 6, shows also another alternate form of hinge clamp —16—, being attached to the main casting —1— in a similar manner to the clamp —8—, but is provided with a single hole —17— in the outer end thereof to receive an ordinary bolt for holding the clamp in place. At the pointed end of the main casting —1— is attached a clevis —18—, formed of a loop bar provided with holes in the ends for receiving the draw pin —19— therein, attaching the clevis to the fixture, and providing a means for connecting a steering bar of a drive-a-way towing device now in use.

Having fully described my drive-a-way towing fixture, what I claim as my invention and desire to secure Letters Patent is:

1. A towing fixture of the character described comprising a cast metal frame for encircling the gear housing in the axle, said frame having one V-shaped end formed thereon, U-sockets formed in opposite sides of the frame for receiving the axle shaft housing therein, said U-socket formed and arranged for hooking over the axle shaft housing and to bring the main frame about the central portion of the axle shaft, a U-bearing formed in one end of the frame to receive the drive bearing housing therein, a hinged clamp attached to the said U-bearing for clamping the casting on the drive gear housing, means for firmly holding the hinge clamp in place against the bearing housing and means for attaching the steering bar of the towing device to the rear end of the fixture.

2. A towing fixture of the character described comprising a cast metal frame for encircling the gear housing in the rear axle of an automobile, U-sockets formed in opposite sides of the frame to receive the axle shaft housing, said sockets formed and arranged for hooking over the axle shaft housing on opposite sides of the gear housing, adjusting the said frame to about the central position of the axle in the horizontal plane, vertical stiffening ribs for the U-socket walls extending along the side walls of the casting, a U-bearing in one end of the frame for receiving the drive bearing housing as attached to the main gear housing, and so positioned as to hold the main frame in a horizontal plane, a hinged clamp attached to the main frame beneath the U-bearing for clamping the frame to the drive gear bearing housing, a lock bolt passing through the free end of the hinge clamp and the frame, for holding the clamp in its closed position, a clevis attached to the rear end of the casting for connecting the steering bar of an automobile towing device.

In witness whereof I sign these specifications.

WALTER P. FLEMING.